No. 779,210. Patented January 3, 1905.

UNITED STATES PATENT OFFICE.

GEORG EGLY, OF CHARLOTTENBURG, GERMANY, ASSIGNOR TO THE FIRM GEBRÜDER SIEMENS & CO., OF CHARLOTTENBURG, GERMANY.

PROCESS OF PRODUCING BARIUM OXID FROM BARIUM CARBONATE.

SPECIFICATION forming part of Letters Patent No. 779,210, dated January 3, 1905.

Application filed April 5, 1904. Serial No. 201,753.

*To all whom it may concern:*

Be it known that I, GEORG EGLY, a subject of the Grand Duke of Hessia, residing at 24 Leibnizstrasse, Charlottenburg, near Berlin, Germany, have invented a certain new and useful Improvement in Processes of Producing Barium Oxid from Barium Carbonate, of which the following is a full, clear, concise, and exact description.

This invention relates to the process of producing barium oxid from barium carbonate, and has for its object to render the process more expeditious and considerably cheaper.

It is known that by heating barium carbonate, barium oxid is produced in a porous condition, although not sufficiently porous for the manufacture of barium peroxid. Moreover, the temperature required is very high. It has been attempted to produce porous barium oxid from other crude materials, notably by heating barium nitrate, which, however, is considerably dearer than barium carbonate, which latter is found in the natural state as witherite, so that it can be procured at a relatively low cost.

My invention has for its objects, first, the production of barium oxid at greatly-reduced expense, and, second, the production of such oxid at comparatively low temperatures, and therefore without danger of fusing or destroying the containing-crucibles.

In the production of barium oxid as heretofore practiced it has been customary to produce a porous barium oxid from barium carbonate or barium nitrate or other compositions of barium, as above stated; but, so far as I am aware, this has never yet been accomplished otherwise than by heating the substance or substances to a white heat.

By my invention barium oxid of a high degree of porosity is obtained from barium carbonate at a temperature which renders the working more expeditious and economical, while any destruction of the containing vessels which may occur in consequence of the high temperatures hitherto employed is avoided. In fact, in the practice of the novel process hereinafter claimed I have ascertained that barium carbonate may be produced when the process is practiced by heating the material to a red heat, it being well understood in the art, as before stated, that in the manufacture of such oxids heretofore it is absolutely necessary that the clearest white heat be produced to effect the result sought. For this purpose the barium carbonate before being heated is mixed with barium nitrate with or without the addition of a reducing agent, such as carbon or a substance which carbonizes when heated—for instance, tar, syrup, or t. l. Volatile hydrocarbons may also be added in order to increase the porosity of the product. The reaction takes place according to the formula:

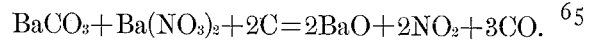

$$BaCO_3 + Ba(NO_3)_2 + 2C = 2BaO + 2NO_2 + 3CO.$$

The addition of barium nitrate has for its object that the decomposition of the carbonate already takes place when nitrous vapors are just beginning to develop from the nitrate. The porosity of the product obtained in this manner is almost the same as that of the products obtained from pure nitrate.

The proportions of carbonate, nitrate, and carbon are best taken approximately according to the molecular proportions as expressed by the equation, but the proportions may be varied, especially in the direction of reducing the barium nitrate. Attention should be paid to the fact that if a large excess of carbonate is present after the nitrate has been decomposed an unreduced residue of barium carbonate may remain, which can only be reduced at a considerably higher temperature. In this case it is necessary after the reduction of the nitrate to raise the temperature to white heat. If by the foregoing reaction a sufficient quantity of barium oxid, besides the excess of barium carbonate, is present, the heating may be effected without entailing the risk of the whole mass being fused and coagulated, as would occur by strongly heating the carbonate alone. The heating is best carried out by means of a suitable electric furnace, which permits of a very accurate regulation of temperature.

What I claim as my invention, and desire to secure by Letters Patent, is—

1. The described process of producing barium oxid consisting in mixing barium carbonate with barium nitrate in substantially the proportions named and then heating the mixture to the required temperature.

2. The described process of producing barium oxid consisting in mixing barium carbonate, barium nitrate and a reducing agent in substantially the proportions named and then heating the mixture to the required temperature.

3. The described process of producing barium oxid consisting in mixing barium carbonate and barium nitrate and then heating the mixture to a dull red heat.

4. The described process of producing barium oxid consisting in mixing barium carbonate, barium nitrate and a reducing agent in substantially the proportions named and then heating the mixture to a red heat.

In witness whereof I hereunto subscribe my name this 22d day of March, A. D. 1904.

GEORG EGLY.

Witnesses:
  WOLDEMAR HAUPT,
  HENRY HASPER.